April 10, 1951 W. S. WORLEY 2,548,135
V-BELT POWER TRANSMISSION SYSTEM
Filed July 25, 1949
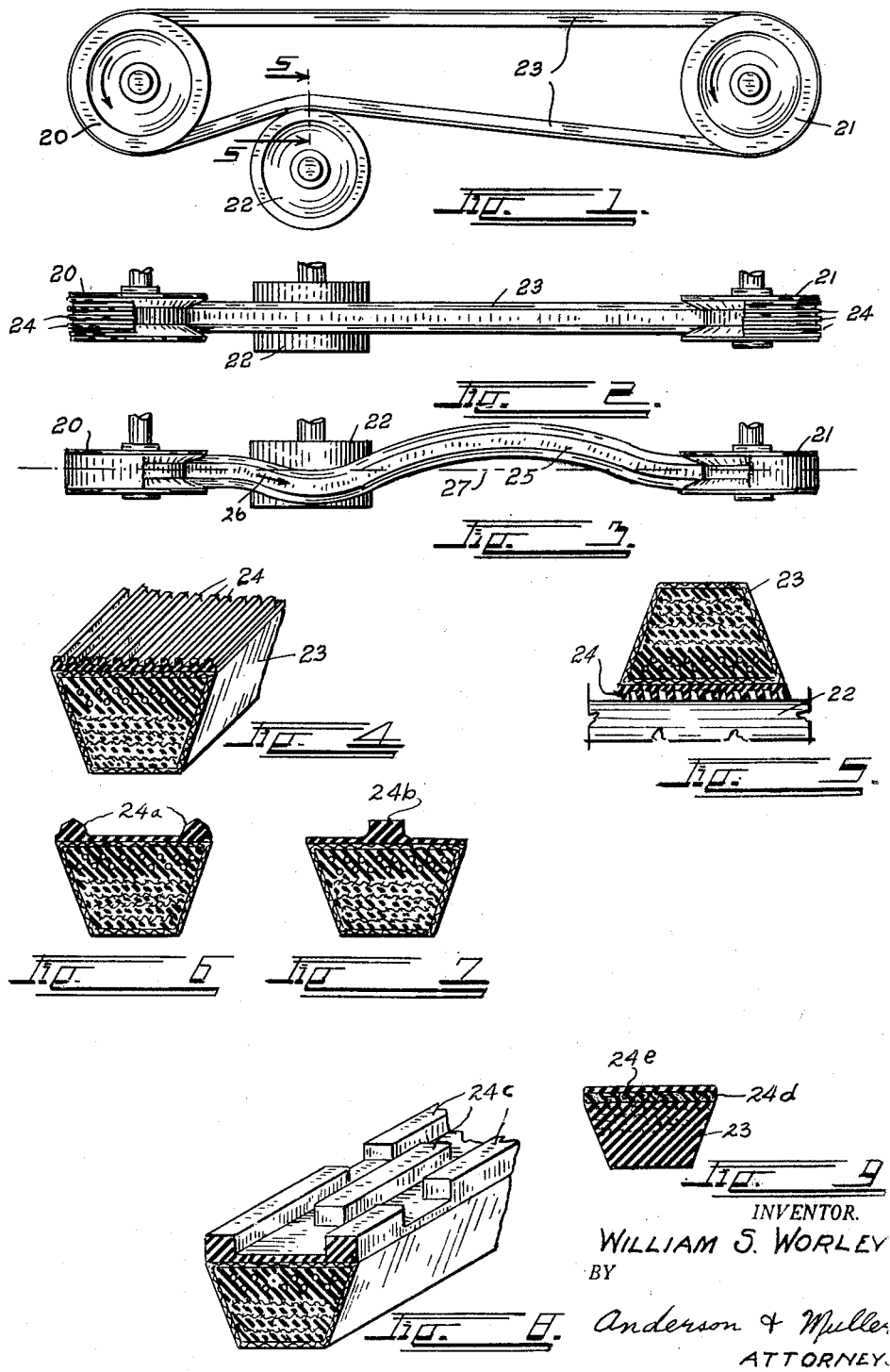
INVENTOR.
WILLIAM S. WORLEY
BY
Anderson & Muller
ATTORNEYS Patented Apr. 10, 1951

2,548,135

UNITED STATES PATENT OFFICE 2,548,135

V-BELT POWER TRANSMISSION SYSTEM

William S. Worley, Denver, Colo., assignor to The Gates Rubber Company, Denver, Colo., a corporation of Colorado Application July 25, 1949, Serial No. 106,708

6 Claims. (Cl. 74—221)

This invention relates to improvements in V belt power transmission systems and more particularly to systems which employ a V belt, or multiple V belts, trained between two sheaves and employing a flat face idler pulley therebetween. This invention is also associated with the subject matter disclosed in copending application Serial No. 176,156 filed July 27, 1950.

In certain types of V-belt power transmission systems it is common practice to employ an idler pulley between the drive and driven sheaves over which the belt is trained, the outside or wide side of the belt engaging the idler pulley. In certain of these transmission systems, especially where there is a considerable distance between sheaves, the "slack" side of the belt often develops a lateral vibration between the sheaves, which in some cases, is so severe that the belt will jump one of the sheaves. In multiple V belt drives this vibration often causes a belt to swing between an adjacent belt and the sheave, which results in cutting or tearing one or more of the belts from the transmission system. Additionally, even where the belt or belts do not jump the pulleys, excessive vibration is present in the transmission system which, of course, is objectionable, and the belt or belts also wear excessively due both to misaligned tracking over the idler pulley and misaligned movement of the belt or belts onto or from the sheaves.

The principal object of the present invention is to provide a V-belt transmission system of the type employing an idler pulley in which the belt travels between sheaves without lateral vibration.

Another object is to provide a V belt having its outer or wide surface so constructed that the belt always tracks onto the idler pulley in a direction normal to the axis of rotation of the pulley.

A further object is to provide a belt of the foregoing type in which a material of appropriate modulus is interposed between the main body of the belt and the surface thereof which contacts the idler pulley.

Still further objects, advantages, and salient features will become more apparent from a consideration of the description to follow, the appended claims, and the accompanying drawing, in which:

Figure 1 is a side elevation of a pulley system and belt which forms the subject of the invention;

Figure 2 is a top plan thereof, the upper run of the belt being broken away;

Figure 3 is a view similar to Figure 2 which illustrates lateral belt vibration when a conventional belt is employed in the sheave system shown in Figures 1 and 2;

Figure 4 is an isometric view of a portion of a belt which may be employed with the sheave system of Figures 1 and 2;

Figure 5 is an enlarged section taken on line 5—5, Figure 1, when the belt shown in Figure 4 is employed; and Figures 6 to 9 illustrate alternative forms of belts which may be employed in the sheave system of Figures 1 and 2.

Referring in detail to the drawing, V sheave 20 is the driver and V sheave 21 the driven, these being supported by any suitable shafts, or the like. Flat face idler pulley 22 is similarly supported and is disposed between sheaves 20, 21 in a manner such that the outer or wide surface of the belt engages pulley 22, as best shown in Figures 1 and 5.

The belt 23 may be of any conventional core or body construction but differs therefrom in that resilient means having an appropriate modulus is interposed between the area of contact of the belt with the idler pulley and the main body of the belt, this means being illustrated in Figures 4 and 5 as a plurality of parallel rubber ribs 24 on the outer side of the belt which serve a purpose to presently be described.

In Figure 3 is shown a conventional V belt with a flat outer surface, the curvature of the belt illustrating one position thereof during lateral vibration, this vibration being started by a gust of wind on the belt, striking the belt with an object, lack of rigidity in the drive system, or any other cause. It has been found that lateral displacement of the belt between idler 22 and sheave 21, say at midspan point 25, causes the belt to track onto the idler in an opposite direction as indicated by arrow 26, that is, out of parallelism with a line 27 between the sheave centers. This causes the belt to swing back with increased velocity producing further misaligned tracking until equilibrium is reached at which time the belt is vibrating laterally at a certain critical amplitude and frequency which may, for example, be the natural frequency of vibration of the belt. The cause of this vibration has been found to be excited by the misaligned tracking of the belt onto the idler pulley. It has also been found that when the belt tracks in alignment, that is, with arrow 26 parallel to line 27, between the pulleys, the vibration is eliminated entirely or minimized.

Various means have been discovered for obtaining proper tracking of the belt onto the idler pulley, that shown in Figures 4 and 5 consisting of a plurality of parallel rubber ribs 24 formed on the wide side of the belt. These ribs should be of such size and resilience that they tend to bend slightly, somewhat as shown exaggerated in Figure 5, at the area of contact between the outer surface of the ribs and the idler when there is a force which tends to start any lateral vibration of the belt. Any distortion takes place in these ribs at the areas of contact just as it is about to track onto the idler, rather than in the main body of the belt. In other words, the belt always tracks onto the idler with arrow 26 in alignment with line 27, rather than as shown in Figure 3, and as previously explained, since the direction of tracking is aligned with the straight line direction of movement of the belt between sheaves, the exciting force which effects cumulative increase of vibration is eliminated.

While a plurality of small parallel ribs have been found to give satisfactory results, and this construction has been chosen to describe the principles of the invention, it is not limited to this particular construction since other types of projections on the belt have also been found satisfactory. For example, in Figure 6 is shown a construction wherein two endless parallel ribs 24a are employed, these ribs being disposed adjacent the edges of the belt and having a tapering cross section as shown. Figure 7 shows a single continuous rib 24b disposed centrally of the belt. Figure 8 shows a construction in which the ribs 24c are parallel but discontinuous. The overlapping of each row of ribs and the spaces in the other rows is such that at least two ribs will always be in contact with the idler pulley. Figure 9 illustrates a construction which eliminates the ribs. In this construction a thick layer of soft rubber-like material 24d is secured to the wide side of the belt, and a thinner layer 24e is secured to the layer aforesaid. In this construction the layer 24d may be of a material of lower modulus than layer 24e so that the slight distortion, analogous to the rib distortion shown in Figure 5, takes place in layer 24d. In other words, layer 24e provides a wearing surface and is movable in a lateral direction relative to the main body 23 of the belt. It is to be understood that any of the construction shown in Figures 6 to 9 may be employed in the transmission systems shown in Figures 1 and 2 and hence the invention is in no sense limited to the specific belt shown in these figures, having the multiplicity of small parallel ribs 24 thereon, this construction being only exemplary of the broad use of ribs or their equivalents.

The resistance or relative rigidity of the ribs, or their equivalents, against lateral distortion depends upon certain variables, such as the cross sectional shape, the modulus of the material, and the configuration or pattern of the ribs or other pulley contacting surface.

While several constructions have been disclosed by which the invention may be practiced, it will now become apparent that many other constructions may be utilized within the purview of the inventions. It is not intended, therefore, to limit the invention to these specific constructions, or any particular one of them, except as defined by the scope of the appended claims.

Having described the invention, what is claimed as new is:

1. A power transmission system comprising; a drive V-sheave, a driven V-sheave, a V-belt connecting the sheaves in a manner such that the drive sheave transmits power to the driven sheave, an idler pulley disposed between the sheaves having a belt contacting surface juxtaposed to the outer wide side of the belt, and resilient means of appropriate modulus of elasticity and shape disposed on the wide side of the belt adapted to cause the belt to track onto the idler pulley in a plane perpendicular to its axis of rotation, the resilient means being constructed and operable to eliminate any substantial lateral vibration of the belt between the idler pulley and the driven sheave.

2. A power transmission system in accordance with claim 1 wherein the resilient means is a rubber like material which tends to distort in a direction parallel to the axis of rotation of the idler pulley, at the area of contact between the belt and idler pulley, under the influence of belt contact.

3. A power transmission in accordance with claim 2 wherein the resilient means includes longitudinally extending rib means adapted to contact the pulley.

4. A power transmission in accordance with claim 2 wherein the resilient means comprises a strip of rubber of substantial thickness coextensive with the width of the belt.

5. In a power transmission system of the type having a drive V-sheave, a driven V-sheave, and an idler pulley disposed between the sheaves, the improvement which comprises; a V-belt for use with the sheaves and pulley adapted to connect the V-sheaves, the outer wide side of the belt having means thereon adapted to engage the idler pulley, said means being resilient and of appropriate modulus of elasticity to cause the belt to track onto the pulley in a plane perpendicular to its axis of rotation, the resilient means being constructed and operable to eliminate any substantial lateral vibration of the belt between the idler pulley and the driven sheave.

6. In a power transmission system of the type having a drive V-sheave, a driven V-sheave, and an idler pulley disposed between the sheaves, the improvement which comprises; a V-belt for use with the sheaves and pulley adapted to connect the V-sheaves, the outer wide side of the belt having means thereon adapted to engage the idler pulley, said means comprising longitudinally extending rib means of rubber like material which tends to distort in a direction parallel to the axis of rotation of the idler pulley, under the influence of belt contact, said rib means being resilient and of appropriate modulus of elasticity to cause the belt to track onto the pulley in a plane perpendicular to its axis of rotation, the rib means being constructed and operable to eliminate any substantial vibration of the belt between the idler pulley and the driven sheave.

WILLIAM S. WORLEY.

REFERENCES CITED

The following references are of record in the file of this patent:

UNITED STATES PATENTS

| Number | Name | Date |
|---|---|---|
| 1,805,442 | Wallfisch | May 12, 1931 |
| 2,067,400 | Koplin et al. | Jan. 12, 1937 |
| 2,073,668 | Wilson | Mar. 16, 1937 |